United States Patent
Kamei et al.

(10) Patent No.: US 8,042,176 B2
(45) Date of Patent: Oct. 18, 2011

(54) COMPUTER READABLE MEDIUM ON WHICH IS STORED A PROGRAM FOR PREVENTING THE UNAUTHORIZED USE OF PROGRAM DATA

(75) Inventors: Mitsuhisa Kamei, Tokyo (JP); Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1110 days.

(21) Appl. No.: 11/183,638

(22) Filed: Jul. 18, 2005

(65) Prior Publication Data

US 2006/0212858 A1    Sep. 21, 2006

(30) Foreign Application Priority Data

Mar. 15, 2005    (JP) ................................. 2005-072374

(51) Int. Cl.
*G06F 12/14* (2006.01)
(52) U.S. Cl. ........................................................ 726/21
(58) Field of Classification Search ............... 726/21
See application file for complete search history.

(56) References Cited

U.S. PATENT DOCUMENTS

| | | | |
|---|---|---|---|
| 5,056,009 A | 10/1991 | Mizuta | |
| 5,206,938 A * | 4/1993 | Fujioka | 711/200 |
| 6,205,550 B1 * | 3/2001 | Nardone et al. | 726/22 |
| 6,237,137 B1 | 5/2001 | Beelitz | |
| 6,519,721 B1 * | 2/2003 | Gorman | 714/48 |
| 6,574,732 B1 * | 6/2003 | Steinberg et al. | 713/193 |
| 7,188,251 B1 * | 3/2007 | Slaughter et al. | 713/182 |
| 7,334,265 B1 | 2/2008 | Morishita | |
| 2002/0108045 A1 * | 8/2002 | Wells | 713/182 |
| 2002/0116590 A1 * | 8/2002 | Franaszek et al. | 711/170 |
| 2002/0157010 A1 * | 10/2002 | Dayan et al. | 713/191 |
| 2002/0194389 A1 * | 12/2002 | Worley et al. | 709/310 |
| 2003/0221116 A1 * | 11/2003 | Futoransky et al. | 713/189 |

FOREIGN PATENT DOCUMENTS

| | | |
|---|---|---|
| JP | 242551 | 2/1990 |
| JP | 2042528 | 2/1990 |
| JP | 4168527 | 6/1992 |
| JP | 11175336 | 7/1999 |
| JP | 2000330783 | 11/2000 |

OTHER PUBLICATIONS

Notice of Grounds for Rejection mailed on Mar. 1, 2011, in connection with corresponding Japanese Application No. 2005-072374 and English translation thereof.
Notice of Grounds for Rejection mailed on May 17, 2011 in connection with corresponding JP Application No. 2005-0723734 and English translation thereof.

* cited by examiner

*Primary Examiner* — Nasser Moazzami
*Assistant Examiner* — Michael S McNally
(74) *Attorney, Agent, or Firm* — Gesmer Updegrove LLP

(57) ABSTRACT

A storage medium stores a program of instructions executable by a computer to perform a function for preventing unauthorized use of program data. The function has a process of judging whether or not a storage area of the program data is writable and a process of executing an unauthorized use prevention process to prevent an unauthorized use of the program data stored in the storage area when the storage area of the program data is writable.

11 Claims, 4 Drawing Sheets

COMPUTER READABLE MEDIUM ON WHICH IS STORED A PROGRAM FOR PREVENTING THE UNAUTHORIZED USE OF PROGRAM DATA

PRIORITY INFORMATION

This application claims priority to Japanese Patent Application No. 2005-072374, filed Mar. 15, 2005, which is incorporated herein by reference in its entirety.

BACKGROUND OF THE INVENTION

1. Field of the Invention

The present invention relates to a technique for preventing the unauthorized use of programs.

2. Description of the Related Art

Computer programs often include data for preventing unauthorized use. For example, it is not preferable to allow a user who does not pay a charge to extract image data from a program when the image data is fee-based. Furthermore, there is a case that confidential information is included in a program regardless of whether or not the information is fee-based. On the other hand, software (debugger) for supporting the development of programs is widely known. For example, a program developer develops a program to perform a desired operation by using a debugger to execute in a stepwise manner. It helps the program developer to understand the state of the program under development and he solves a problem within the program.

A concern in this situation is a case where an unauthorized user attempts to exploit data within a program, for example, by using the debugger. For this reason, a technique was desirable to prevent data within a program from being exploited, such as via a debugger.

Japanese Patent Laid-Open Publication No. Hei 11-175336 discloses a technique for referencing a memory location (including debug register) in a processor to judge whether or not it is in a debug mode and preventing program execution if it is in the debug mode.

In the technique described in Japanese Patent Laid-Open Publication No. Hei 11-175336, the memory location in the processor is referenced. However, with regard to whether or not the processor has a memory location (such as debug register), this is dependent on the architecture of the processor. Thus, the technique described in Japanese Patent Laid-Open Publication No. Hei 11-175336 cannot be utilized by processors that do not have debug registers.

Furthermore, the technique described in Japanese Patent Laid-Open Publication No. Hei 11-175336 is not adaptable to debugging methods in which the content of the memory location in the processor is not influenced.

SUMMARY OF THE INVENTION

The present invention provides a technique for preventing the unauthorized use of programs.

As an embodiment of the present invention, disclosed is a storage medium readable by a computer, the storage medium storing a program of instructions executable by the computer to perform a function for preventing unauthorized use of program data. The function has a process of judging whether or not a storage area of the program data within a memory is in a writable state and a process of executing an unauthorized use prevention process to prevent an unauthorized use of the program data stored in the storage area when the storage area of the program data is in a writable state.

In the above-mentioned constitution, the program data within the memory refers to the state where a program has been read by the computer and loaded into the memory, and the program data includes, for example, executable codes. Furthermore, the program data may be reference data that is referenced during program execution. Although the main storage of a CPU within a computer is a typical example of memory, the memory may be any other storage device.

In the above-mentioned constitution, if the storage area for the program data is in a writable state, the unauthorized use prevention process is executed since it is possible a debugger, for example, is being utilized. Naturally, even if a method other than a debugger is being utilized and if the storage area for the program data is in a writable state, the unauthorized use prevention process is executed. Thus, it is possible to prevent the unauthorized viewing or tampering of the program data, such as by a debugger.

BRIEF DESCRIPTION OF THE DRAWINGS

Embodiments of the present invention will be described in detail based on the following figures, wherein.

DETAILED DESCRIPTION OF THE INVENTION

An embodiment of the present invention will be described hereinafter with reference to the attached figures.

Figure 1:
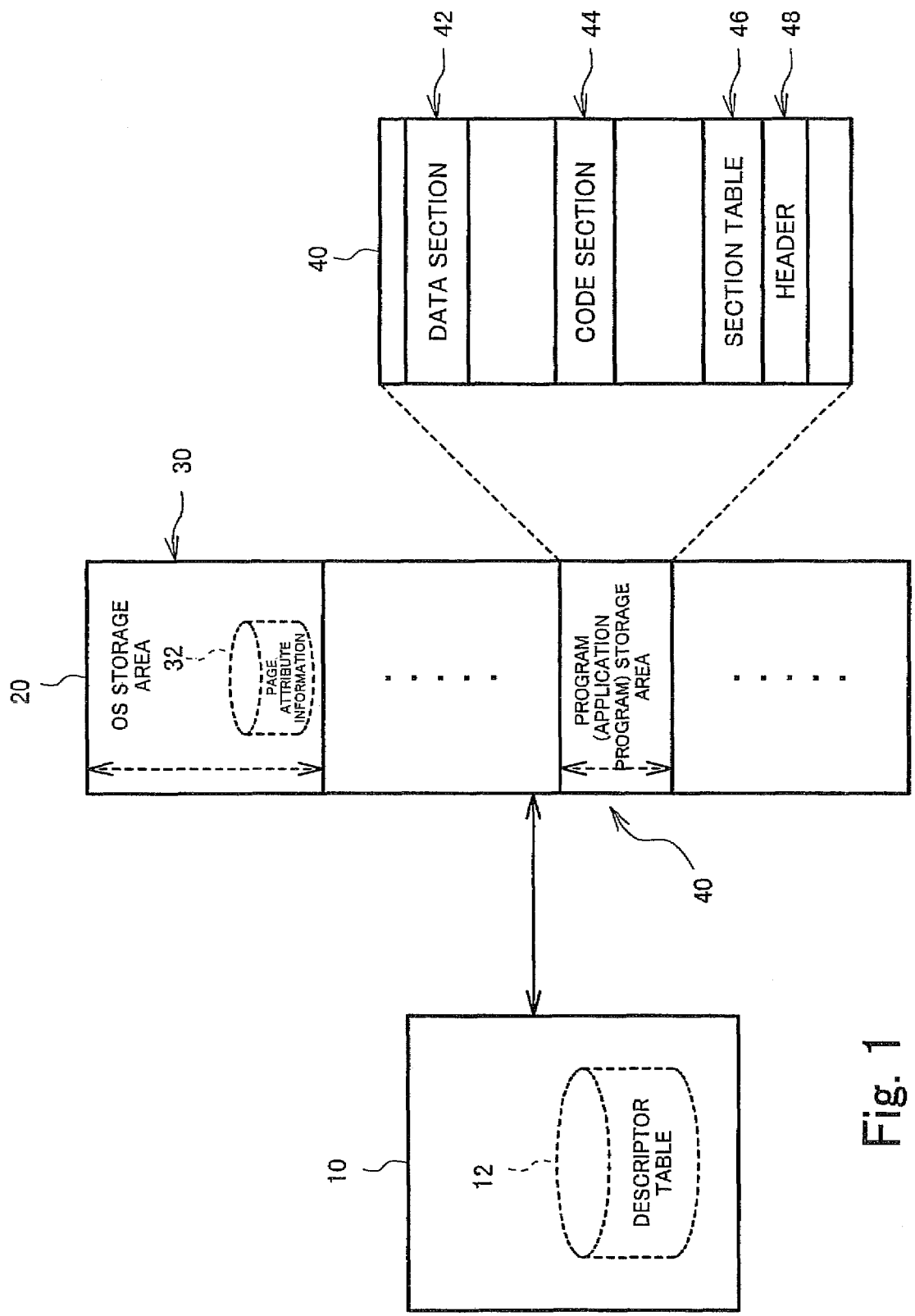
FIG. 1 is a schematic diagram of a CPU periphery of a computer operating according to a program stored in a medium relating to the present invention.

FIG. 1 is a schematic diagram of a CPU periphery of a computer operating according to a program stored in a medium relating to the present invention.

Storage media for storing programs include optical discs, magnetic discs, memory, and so forth. A program may be provided from a storage medium directly to a computer or may be provided via a network to a computer. A program that is provided to a computer is stored, for example, in a hard disc within the computer.

A CPU (Central Processing Unit) 10 interprets instructions listed in a program and operates according to those instructions to perform data operations or processing. Furthermore, various sections within the computer are controlled according to the instructions listed in the program. The program utilized by the CPU 10 is stored in a memory 20.

The memory 20 is formed, for example, from DRAM (Dynamic Random Access Memory) and functions as a main storage for the CPU 10. Namely, the program stored, such as in a hard disc (not shown), is first loaded (stored) into the memory 20, and the CPU 10 utilizes the program that was loaded into memory 20. A cache memory or the like may be disposed between the memory 20 and the CPU 10.

Various types of programs for causing the computer to operate appropriately are stored within the memory 20. One program is an operating system (OS) and is stored in an OS storage area 30 within the memory 20. Besides the OS, various application programs are also stored within the memory 20. One of those programs is stored in a program (application program) storage area 40.

The OS controls the hardware resources (such as keyboard, mouse, and display, which are not shown, in addition to the CPU 10 and memory 20) within the computer and provides an API (Application Program Interface) as needed to support a role for interfacing between the hardware resources and the application programs. Furthermore, when a plurality of application programs are concurrently used within the computer, the OS comprises functions to efficiently allocate the hardware resources with respect to each application program. In this sense, it can be said that the application programs are executed under control of the OS.

The program storage area 40 is allocated for each of a plurality of application programs within the memory 20. FIG. 1 shows only one program storage area 40, and further shows a storage state within the program storage area 40. A program comprises a data sequence for executing a succession of processes in the computer. In FIG. 1, the data sequence (program data) of the program that is loaded into the memory 20 is divided according to function, namely, a data section 42, a code section 44, a section table 46, and a header 48.

The data section 42 includes, for example, data to be referenced during the execution of the program. The code section 44 includes executable code indicating the execution procedure for the program. The section table 46 includes information indicating the address within the memory 20 to which the data sequence of the program is to be loaded. The program is installed to a hard disk within the computer, such as, for example, via an optical disc medium. When utilizing the program (data sequence) that was installed onto the hard disc, the computer loads (stores) the data sequence of the program (program data) into the memory 20. The section table 46 includes information indicating the addresses within the memory 20 to where the data section 42, the code section 44, the section table 46 itself, and the header 48 are to be stored. On the basis of this information, the computer (OS) stores the respective data into the memory 20.

In this embodiment, the unauthorized use of the data sequence of the program (program data) that was loaded into the memory 20 can be prevented. For example, the unauthorized use of program data is performed by a debugger. Namely, an unauthorized user will utilize a debugger to rewrite the program data that has been loaded into the memory 20 so as to manipulate fee settings, modify or tamper with the operation of the program so as to avoid proper fee operations, or acquire confidential information from the program data.

The executable code (within code section 44) of the program that was loaded into the memory 20 has been set to be either writable or read-only. Whether the executable code is writable or read-only is set within the executable code file (for example, within the section table 46) of that program, and the OS sets the executable code for the program to writable or read-only when it is being loaded into the memory 20 in accordance with the executable code file.

When a write instruction is issued for the area (code section 44) of the executable code in the memory 20 that was set as read-only, the CPU 10 generates an exception for an access violation. Thus, when rewriting the executable code of the program to be debugged in the memory 20, the debugger first sets the area for the executable code to be writable using the functions (API) provided by the OS and then performs debugging.

This embodiment prevents the unauthorized use of program data by observing whether or not the storage area for the program data within the memory 20 is in a writable state. This procedure is described hereinafter. In the description hereinafter, the reference numerals shown in FIG. 1 are used.

Figure 2:
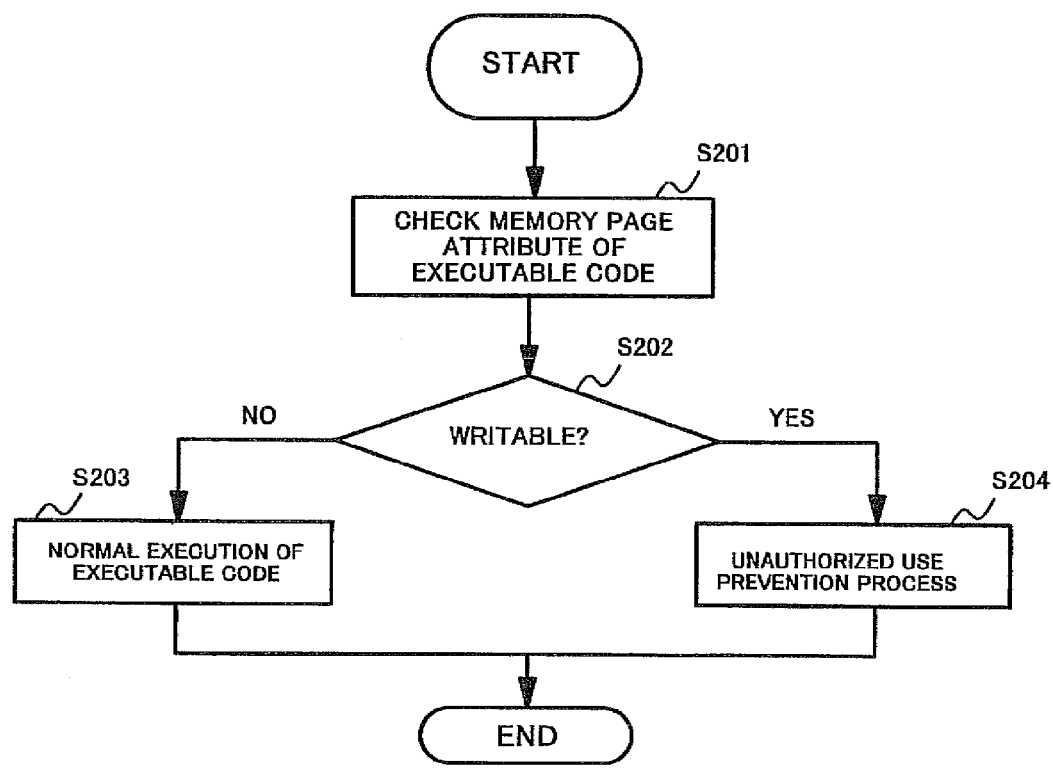
FIG. 2 is a flowchart showing procedure 1 for preventing the unauthorized use of program data.

FIG. 2 is a flowchart showing a procedure 1 for preventing the unauthorized use of program data. This procedure takes effect at the start of execution or during execution of a program (referred to hereinafter as a target program) of which unauthorized use is to be prevented. The process at each step will be detailed.

S201: When this procedure begins, a memory page attribute for an executable code of the targetprogram is first examined. Namely, regarding the executable code (stored in the code section 44) of the target program that was loaded into the memory 20, the memory state of the area (page) of the memory 20 in which the executable code is held is examined. A descriptor table 12 managed by the CPU 10 includes data indicating whether or not each area within the memory 20 is in a writable state. Furthermore, page attribute information 32 managed by the OS also includes data indicating whether or not each area (for example, page) within the memory 20 is in a writable state.

S202: Next, the memory state of the executable code of the target program is judged to be writable or not by referencing the descriptor table 12 or the page attribute information 32.

S203: As a result of the judgment in S202, if the memory state is read-only, the executable code is executed normally. Namely, if the memory state is read-only, it is judged that the executable code is not in a state where it can be rewritten, such as by a debugger. In this case the target program is executed normally and this procedure terminates.

S204: On the other hand, as a result of the judgment in S202, if the memory state is writable, an unauthorized use prevention process is executed to prevent unauthorized use of the executable code. Namely, if the memory state is writable, it is judged that the executable code is in a state where it can be rewritten by a debugger so that an unauthorized use prevention process is executed to prevent rewriting and this procedure terminates.

A process for stopping the execution of the target program, for example, can be given as an unauthorized use prevention process. Namely, the target program is stopped to prevent use by an unauthorized user. Thus, debugging also cannot be performed. The target program may also be destroyed in order to stop execution. Furthermore, as an unauthorized use prevention process, a guard may be placed on important data in the target program. For example, important data, such as image data or confidential information, may be prevented from being read. Or, the important data may be destroyed to prevent it from being read. Furthermore, as an unauthorized use prevention process, a message may be transmitted to the provider of the target program to indicate the unauthorized use.

In the above-mentioned manner, the unauthorized use of the target program is prevented. The above-mentioned procedure (from start to end) may be executed at each step in a process where the executable code of the target program is executed in a stepwise manner. Furthermore, immediately after the start of execution of the target program, the procedure may be used at one time to for checking the memory state of the executable code in its entirety. In this instance, for example, the memory state only of important codes may be checked.

The procedure shown in FIG. 2 is implemented by the program (unauthorized use prevention program). For example, the target program itself could have a program structure that includes in advance an unauthorized use prevention program. Or, an unauthorized use prevention program tool could be created separately from the target program and could incorporate the procedure of FIG. 2 into the target program.

Figure 3:
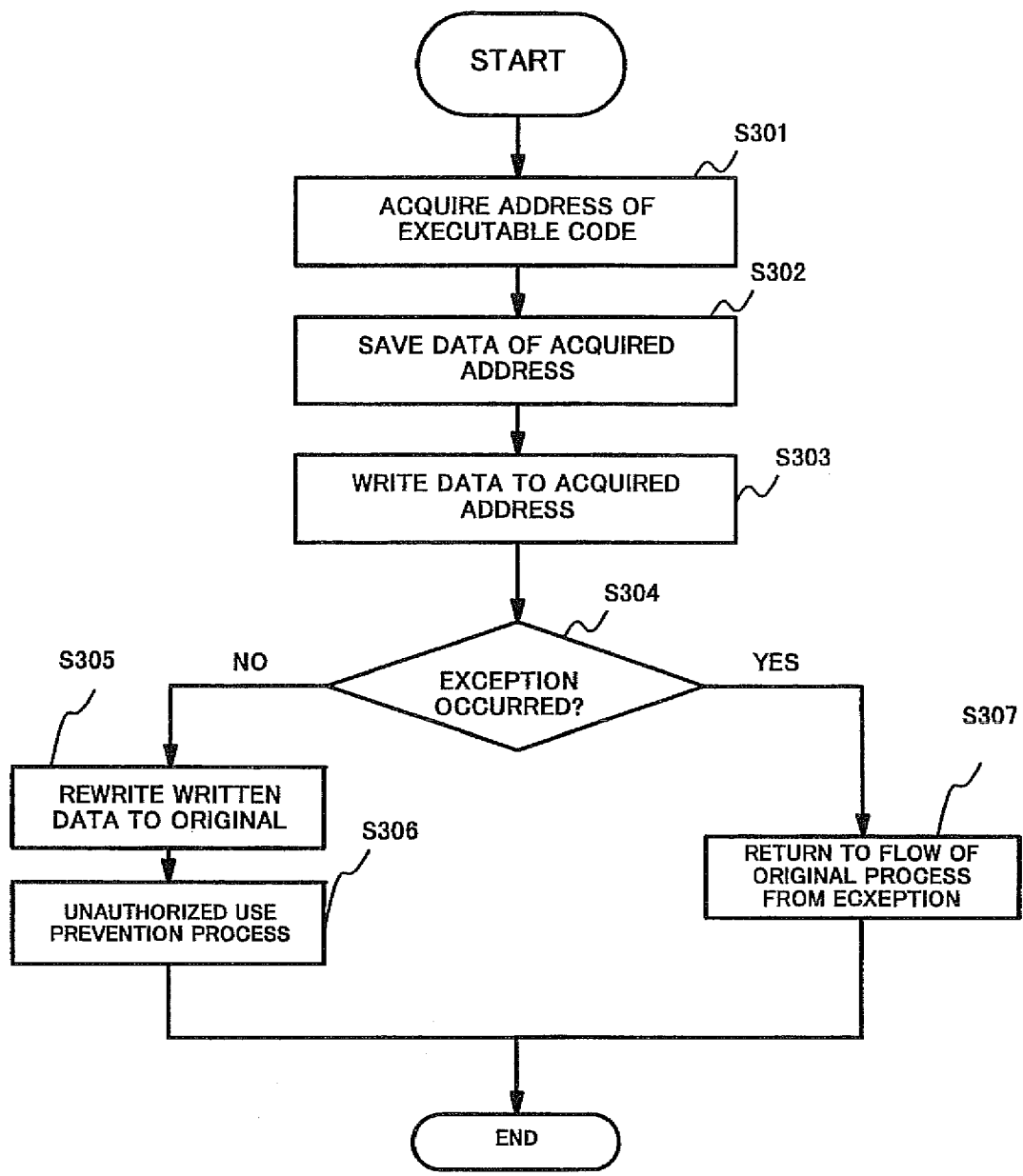
FIG. 3 is a flowchart showing procedure 2 for preventing the unauthorized use of program data.

FIG. 3 is a flowchart showing a procedure 2 for preventing the unauthorized use of program data. This procedure takes effect at the start of execution or during execution of the target program. The process at each step will be detailed.

S301: When this procedure begins, the address of an executable code of the target program is first acquired. Namely, regarding the executable code (stored within code section 44) of the target program that was loaded into the memory 20, the address of the memory 20 holding the executable code is acquired. For example, the address of the desired executable code can be known by referencing the section table 46. Although this step may be designed so that the address is referenced, the programmer may also embed in advance the address into the code as data, which is then referenced. Or, since the address of the executable code currently being executed can be known by referencing the program counter (not shown) of the CPU 10, the address of the desired executable code may be obtained on the basis of the address of the executable code currently being executed.

S302: Next, data for the acquired address is saved. For example, the executable code at the acquired address is temporarily stored, such as in the memory 20.

S303: The data is then written to the acquired address. The data to be written may be the same executable code that was stored at that address or the data may be different from the executable code that was stored (for example, data for destroying the target program).

S304: Then, as a result of the write operation, a check is performed to determine whether or not an exception for an access violation has occurred. If the acquired address is in a read-only state, the attempted write operation causes the CPU 10 to generate an exception for the access violation. If the acquired address is in a writable state, an exception for the write violation does not occur and the data written in S303 is stored in that address.

S305: If an exception for an access violation does not occur in S304, the data written in S303 is rewritten to the original data. Namely, the data is restored to the original executable code that was saved in S302. This process (S305) may be omitted so that the flow advances from S304 to S306.

S306: If an exception for an access violation does not occur, namely, if the memory state is writable, it is judged that a state exists where the executable code is rewritable by a debugger. To prevent this, an unauthorized use prevention process is executed and this procedure terminates. A process for stopping the execution of the target program as described in S204 of FIG. 2, a process for destroying the target program, a process for placing a guard on important data in the target program, a process for transmitting a message indicating the unauthorized use to the provider of the target program, and so forth can be given as the unauthorized use prevention process.

S307: If an exception for an access violation occurs in S304, the execution is returned from the exception to the original process. If the exception for an access violation occurs, namely, if the memory state is in a read-only state, it is judged that the executable code is not in a state where it can be rewritten, such as by a debugger, and the target program is executed normally. However, if an exception for an access violation occurs, it is necessary to return to the process for the original target program from the exception state in order for the target program to execute normally because the execution transfers to an exception state by OS. Thus, the execution returns from the exception state in S307, the execution of the target program is continued, and this procedure terminates.

In the above-mentioned manner, the unauthorized use of the target program is prevented. The above-mentioned procedure (from start to end) may be executed at each step in a process where the executable code of the target program is executed in a stepwise manner. Furthermore, immediately after the start of execution of the target program, the procedure may be used at one time for checking all executable codes. In this instance, for example, checking may be performed only for important codes or important handling codes.

Furthermore, in the above-mentioned procedure, when a certain executable code is executing, checking may be performed for subsequent executable codes. Namely, the address of an executable code to be subsequently executed may be acquired in S301. Then, the process of S302 is omitted and destructive data is written in S303. In this case, in place of the processes S305 and S306, the target program may be executed in a state where destructive data has been written.

The procedure shown in FIG. 3 is implemented by the program (unauthorized use prevention program). For example, the target program itself could have a program structure that includes in advance an unauthorized use prevention program. Also, an unauthorized use prevention program tool could be created separately from the target program and could incorporate the procedure of FIG. 3 into the target program.

Figure 4:
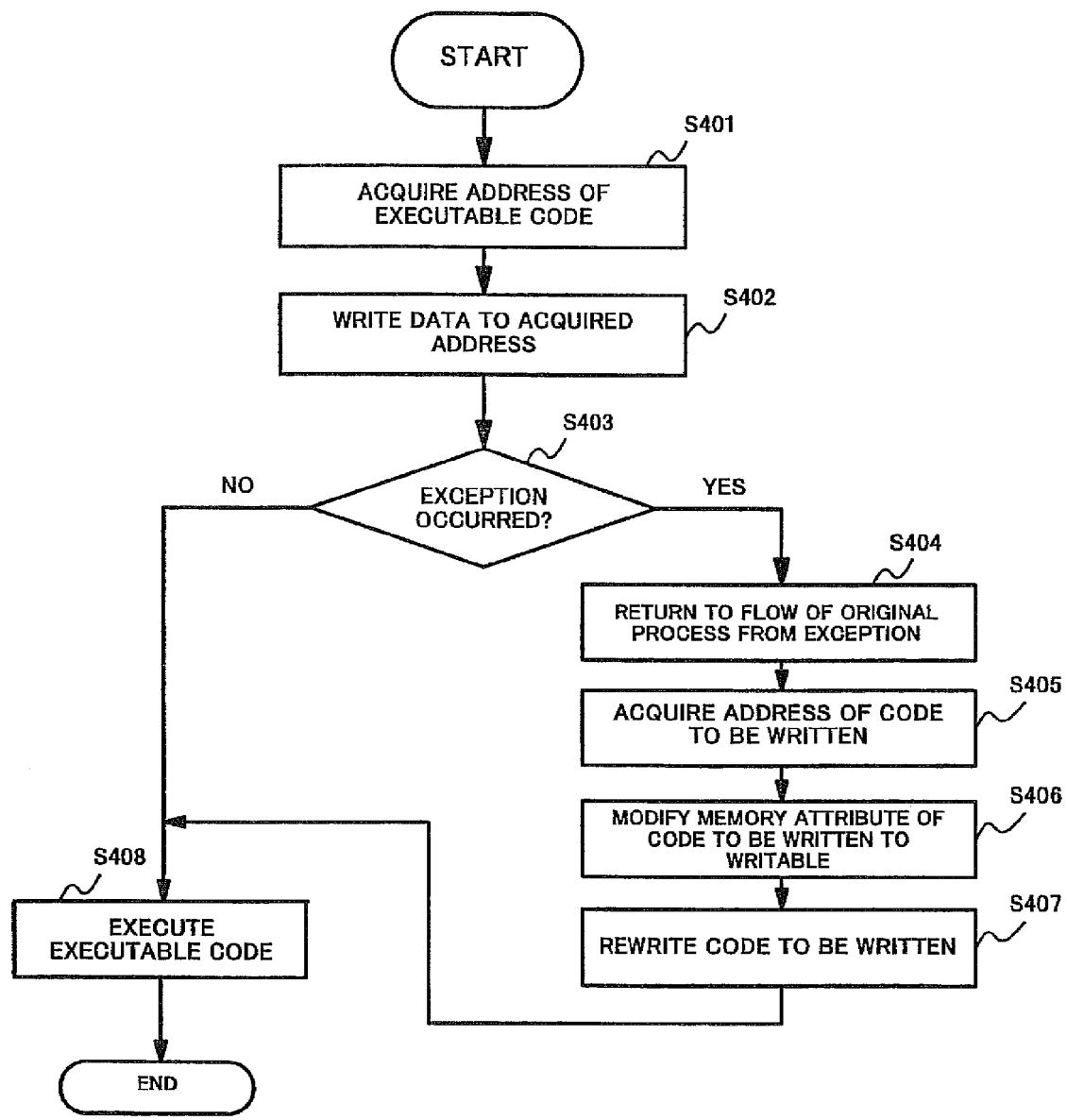
FIG. 4 is a flowchart showing procedure 3 for preventing the unauthorized use of program data.

FIG. 4 is a flowchart showing a procedure 3 for preventing the unauthorized use of program data. It is preferable for this procedure to be utilized when the code (data) to be rewritten is included within the target program. Namely, such a target program could have encrypted code, for example, within the target program, and the encrypted code could be decrypted and rewritten with the decrypted code, then executed. It should be noted that the data to be rewritten is not limited to encrypted data. For example, such a target program could have compressed code, and the compressed code could be decompressed and rewritten with the decompressed code, then executed. Furthermore, at the execution of the target program, the executable code may be first written, to the location where the data is to be rewritten, and then executed. The process at each step will be detailed.

S401: When this procedure begins, the address of an executable code of the target program is first acquired. Namely, regarding the executable code (stored within code section 44) of the target program that was loaded into the memory 20, the address of the memory 20 holding the executable code is acquired. For example, the address of the desired executable code can be known by referencing the section table 46. Although this step may be designed so that the address is referenced, the programmer may also embed in advance the address into the code as data, which is then referenced. Also, since the address of the executable code currently being executed can be known by referencing the program counter (not shown) of the CPU 10, the address of the desired executable code may be obtained on the basis of the address of the executable code currently being executed. The address of the executable code that is acquired here may be the address of the data to be rewritten or the address of any other executable code.

S402: Next, data is written to the acquired address. The data to be written may be the same executable code that was stored at that address or may be data differing from the executable code that was stored (for example, data for destroying the target program).

S403: As a result of the write operation, a check is performed with regard to whether or not an exception for an access violation has occurred. If the acquired address is in a read-only state, the attempted write operation causes the CPU 10 to generate an exception for the access violation. If the acquired address is in a writable state, an exception for the write violation does not occur and the data written in S402 is stored in that address.

S404: If an exception for an access violation occurs in S403, the execution is returned from the exception to the original process. If the exception for an access violation occurs, namely, if the memory state is in a read-only state, it is judged that the executable code is not in a state where it can be rewritten, such as by a debugger. However, if an exception for an access violation occurs, it is necessary to return to the process for the original target program from the exception state in order for the execution of the target program to continue because the execution transfers to an exception state by OS. Thus, the execution is returned from the exception state in S404.

S405: Next, the address of the code to be rewritten is acquired. Namely, the address of the memory 20 holding the code to be rewritten among the executable codes (stored within code section 44) for the target program that was loaded into the memory 20 is acquired.

S406: Furthermore, the memory attribute of the code to be rewritten is modified to writable. Namely, if the executable code is not in a state where it can be rewritten, such as by a debugger, and since the memory state is read-only also for the address of the code to be rewritten, the memory attribute is modified to writable for subsequent rewriting processes.

S407: The code to be rewritten is then rewritten. For example, an encrypted code to be rewritten is decrypted and rewritten with the decrypted code. Or, a compressed code to be rewritten is decompressed and rewritten with the decompressed code. After the rewriting process is performed in S407, the memory attribute of the code to be rewritten may be returned to read-only.

S408: The target program is executed and this procedure terminates. If an exception for an access violation occurs in S403, the code to be rewritten is properly rewritten by the process from S404 to S407 so that the target program normally executes in S408. On the other hand, if an exception for an access violation does not occur in S403, the executable code is executed without rewriting the code to be rewritten. Thus, the target program does not execute normally. In this manner, an unauthorized use of the target program is prevented.

In the above-mentioned procedure, the following modification may be made. The above-mentioned processes of S405 to S407 are first sequentially executed and the code to be rewritten is rewritten. In this instance, the memory attribute of the code to be rewritten is returned to read-only after the rewriting process has been performed. Then, the above-mentioned processes of S401 to S403 are sequentially executed, and a check is performed with regard to whether or not an exception for an access violation has occurred. In this manner, after confirming whether or not an exception for an access violation has occurred, the processes after S304 of FIG. 3, for example, may be executed.

The procedure shown in FIG. 4 is implemented by the program (unauthorized use prevention program). For example, it is preferable for the target program itself that includes code to be rewritten to have a program structure that includes in advance the unauthorized use prevention program. However, an unauthorized use prevention program tool could be created separately from the target program and could incorporate the procedure of FIG. 4 into the target program.

In the procedures shown in FIG. 3 and FIG. 4, as a result of writing data to the acquired address, the executable code is checked with regard to whether or not it is in a state where it can be rewritten, such as by a debugger, on the basis of whether or not an exception for an access violation occurred. Instead of this check (S304 and. S403) with regard to whether or not an exception for an access violation has occurred, a procedure for performing a judgment using a hash value may be considered. Namely, in S303 or S402, as a result of writing data to the acquired address, a check may be made with regard to whether or not an executable code is in a state where it can be rewritten on the basis of whether or not the hash value of a data sequence including data to be written is maintained at the same value before and after the data writing process. If the executable code is in a state where it can be rewritten, such as by a debugger, the data can be rewritten by the data writing process. As a result, the hash values differ before and after the data writing process. Thus, if the hash values differ before and after the writing process, the unauthorized use prevention process (refer to S306) is executed.

Furthermore, a modified form of FIG. 4 can be considered next. In S402, a process is performed to write data differing from the stored executable code, after which a hash value is calculated for the data sequence that includes the data at the address for the writing process. Then, S403 and S404 are omitted, and the processes of S405 to S407 are executed. In this instance, the rewriting process for the code to be rewritten in S407 is performed utilizing the calculated hash value. For example, an encrypted code to be rewritten is decrypted utilizing the calculated hash value. As a consequence, if as a result of the writing process in S402 the data at the address for the writing process is rewritten (namely, a state where the executable code can be rewritten, such as by a debugger), the hash value is calculated incorrectly so that the rewriting process for the code to be rewritten fails in S407 and the unauthorized use of the target program is prevented.

The embodiments of the present invention are described hereinabove. However, it should be noted that the above-mentioned embodiments are not intended to limit the scope of the present invention. For example, in the embodiments described in FIG. 2 to FIG. 4, it is possible to incorporate a step given in each figure into the procedure of another figure as necessary. Also, it is possible to omit a step shown in FIG. 2 to FIG. 4 as necessary or replace it with a step utilizing a widely known technique.

Furthermore, according to an aspect of the present invention, disclosed is a storage medium readable by a computer, the storage medium storing a program of instructions executable by the computer to perform a function for preventing unauthorized use of program data. The function has a process of judging whether or not a storage area of the program data within a memory is in a writable state and a process of executing an unauthorized use prevention process to prevent an unauthorized use of the program data stored in the storage area when the storage area of the program data is in a writable state.

Moreover, according to an aspect of the present invention, disclosed is the function further comprising: executing a process for writing destructive data to a storage area of the program data in memory; executing destructive-state program data having been written with the destructive data as the unauthorized use prevention process when the storage area of the program data is in a writable state; executing normal-state program data not having been written with the destructive data when the storage area of the program data is not in writable state.

Moreover, according to an aspect of the present invention, disclosed is the storage medium, wherein when a result of the judging the state is not in the writable state, the storage area is modified to a writable state and the data is rewritten to be executed.

Moreover, according to an aspect of the present invention, disclosed is a storage medium readable by a computer, the storage medium storing a program of instructions executable by the computer to perform a function for preventing unauthorized use of program data, the function comprising: executing a process for writing data to a storage area of program data; calculating a hash value for a data sequence that includes the data; rewriting the data to be rewritten included in the program data by the calculated hash value; and executing the program data that was rewritten.

Moreover, according to an aspect of the present invention, disclosed is the storage medium, wherein the function is stored in a tool program and the tool program is embedded in the program data.

Moreover, according to an aspect of the present invention, disclosed is a storage medium readable by a computer, the storage medium storing a program of instructions executable by the computer to perform a function for converting a target program to a unauthorized use prevention program for preventing unauthorized use of program data of the target program, the function comprising: converting the target program to the unauthorized use prevention program, wherein the unauthorized use prevention program has a process of judging and a process of executing, and the judging process judges whether or not a storage area of the program data is writable, and the executing process executes an unauthorized use prevention process to prevent an unauthorized use of the program data when the storage area of the program data is writable.

The embodiments and modes of the present invention described hereinabove make it possible to more robustly prevent the unauthorized use of program data. For example, it is possible to prevent the unauthorized viewing or tampering of the program data, such as by a debugger, independently of processor architecture.

The entire disclosure of Japanese Patent Application No. 2005-072374 filed on Mar. 15, 2005 including specification, claims, drawings, and abstract is incorporated herein by reference it its entirety.

While there has been described what are at present considered to be embodiments of the invention, it will be understood that various modifications may be made thereto, and it is intended that the appended claims cover all such modifications as fall within the true spirit and scope of the invention.

What is claimed is:

1. A non-transitory storage medium readable by a computer, the storage medium storing a program of instructions executable by the computer to perform a function for preventing unauthorized use of program data, the function comprising:
   judging whether an executable code for program data, the program data including encrypted data having been loaded into a memory, is set to be writable; and
   executing an unauthorized use prevention process to prevent an unauthorized use of the program data loaded in the memory;
   said executing an unauthorized use prevention process including,
      modifying a memory attribute of the encrypted data of the program data to writable when the executable code for the program data is not set to be writable,
      rewriting the encrypted data of the program data with decrypted data when the executable code for the program data is not set to be writable,
      executing the program data in which the encrypted data is rewritten with the decrypted data when the executable code for the program data is not set to be writable, and
      executing the program data including the encrypted data when the executable code for the program data is set to be writable.

2. The non-transitory storage medium according to claim 1, wherein the judging of the executable code is performed based on a descriptor table managed by the computer.

3. The non-transitory storage medium according to claim 1, wherein the judging of the executable code is performed on the basis of whether an exception for an access violation occurs as a result of executing a process for writing data to the program data.

4. The non-transitory storage medium according to claim 1, wherein a process for writing data to the program data is executed and the judging of the executable code is performed on the basis of whether a hash value of a data sequence that includes the data stored in the memory remains the same value before and after the process for writing the data.

5. The non-transitory storage medium according to claim 1, wherein the unauthorized use prevention process stops normal execution of the program data loaded in the memory.

6. The non-transitory storage medium according to claim 1, wherein the unauthorized use prevention process guards important data or important data handling codes of the program data loaded in the memory.

7. The non-transitory storage medium according to claim 1, wherein the unauthorized use prevention process transmits a message conveying unauthorized use of the program data loaded in the memory.

8. The non-transitory storage medium according to claim 1, wherein the function is stored in a tool program and the tool program is embedded in the program data.

9. A non-transitory storage medium readable by a computer, the storage medium storing a program of instructions executable by the computer to perform a function for converting a target program to an unauthorized use prevention program for preventing unauthorized use of program data of the target program, the function comprising:
   converting the target program to the unauthorized use prevention program, wherein the unauthorized use prevention program has a process of judging and a process of executing, and the judging process judges whether an executable code for program data, the program data including encrypted data having been loaded into a memory, is set to be writable, and the executing process executes an unauthorized use prevention process to prevent an unauthorized use of the program data loaded in the memory when the executable code for the program data is set to be writable, the executing process executes the unauthorized use prevention process by modifying a memory attribute of the encrypted data of the program data to writable when the executable code for the program data is not set to be writable, rewriting the encrypted data of the program data with decrypted data when the executable code for the program data is not set to be writable, executing the program data in which the encrypted data is rewritten with the decrypted data when the executable code for the program data is not set to be writable, and executing the program data including the encrypted data when the executable code for the program data is set to be writable.

10. A non-transitory storage medium readable by a computer, the storage medium storing a program of instructions executable by the computer to perform a function for preventing unauthorized use of program data, the function comprising:

judging whether an executable code for program data, the program data including compressed data having been loaded into a memory, is set to be writable; and executing an unauthorized use prevention process to prevent an unauthorized use of the program data loaded in the memory;

said executing an unauthorized use prevention process including, modifying a memory attribute of the compressed data of the program data to writable when the executable code for the program data is not set to be writable, rewriting the compressed data of the program data with decompressed data when the executable code for the program data is not set to be writable, executing the program data in which the compressed data is rewritten with the decompressed data when the executable code for the program data is not set to be writable, and executing the program data including the compressed data when the executable code for the program data is set to be writable.

11. A non-transitory storage medium readable by a computer, the storage medium storing a program of instructions executable by the computer to perform a function for converting a target program to an unauthorized use prevention program for preventing unauthorized use of program data of the target program, the function comprising:

converting the target program to the unauthorized use prevention program, wherein the unauthorized use prevention program has a process of judging and a process of executing, and the judging process judges whether an executable code for program data, the program data including compressed data having been loaded into a memory, is set to be writable, and the executing process executes an unauthorized use prevention process to prevent an unauthorized use of the program data loaded in the memory when the executable code for the program data is set to be writable, the executing process executes the unauthorized use prevention process by modifying a memory attribute of the compressed data of the program data to writable when the executable code for the program data is not set to be writable, rewriting the compressed data of the program data with decompressed data when the executable code for the program data is not set to be writable, executing the program data in which the compressed data is rewritten with the decompressed data when the executable code for the program data is not set to be writable, and executing the program data including the compressed data when the executable code for the program data is set to be writable.

* * * * *